United States Patent
Mitamura et al.

(10) Patent No.: US 6,621,257 B2
(45) Date of Patent: Sep. 16, 2003

(54) DC-DC CONVERTER

(75) Inventors: Atsushi Mitamura, Hanno (JP); Hideyuki Ono, Hanno (JP)

(73) Assignee: Shindengen Electric Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/163,410

(22) Filed: Jun. 7, 2002

(65) Prior Publication Data

US 2002/0185995 A1 Dec. 12, 2002

(30) Foreign Application Priority Data

Jun. 7, 2001 (JP) .................................. P2001-172624

(51) Int. Cl.$^7$ ............................................... G05F 1/40
(52) U.S. Cl. ........................................................... 323/282
(58) Field of Search ................................. 323/282, 284, 323/285, 351

(56) References Cited

U.S. PATENT DOCUMENTS

| 5,479,090 A | * | 12/1995 | Schultz | 323/284 |
| 5,777,512 A | | 7/1998 | Tripathi et al. | |
| 6,154,161 A | * | 11/2000 | Leme et al. | 341/143 |
| 6,191,676 B1 | * | 2/2001 | Gabor | 336/160 |
| 6,246,215 B1 | * | 6/2001 | Popescu-Stanesti | 320/139 |
| 6,404,655 B1 | * | 6/2002 | Welches | 363/41 |
| 6,448,745 B1 | * | 9/2002 | Killat | 323/222 |

* cited by examiner

Primary Examiner—Adolf D. Berhane
(74) Attorney, Agent, or Firm—Nixon & Vanderhye P.C.

(57) ABSTRACT

The present invention provides a stable, highly efficient DC-DC converter that uses ΔΣ modulation capable of limiting excessive peak current flowing inside the converter by monitoring the current flowing inside the converter with an integrator located inside the ΔΣ modulator. A highly efficient ΔΣ modulation type of DC-DC converter can be provided capable of stable control without requiring a detection resistor by composing the ΔΣ modulator with an adder, integrator, quantizer and attenuator, providing an AND circuit that limits the on period of the output signal of a power switching element, and limiting the excessive peak current flowing within the converter.

6 Claims, 4 Drawing Sheets

DC-DC CONVERTER

BACKGROUND OF THE INVENTION

1. Field of the Invention

The present invention relates to a DC-DC converter which uses a ΔΣ modulator to limit excessive peak current flowing to an inductor and power switching element by monitoring the current flowing to said inductor with an integrator composed with a ΔΣ modulator.

2. Description of the Related Art

ΔΣ modulation is a modulation method in which modulator input signal us integrated, quantization is carried out by comparing the integrated value with a reference voltage, and modulator output signal is fed back to the modulator input. FIG. 3 is a block drawing of a primary ΔΣ modulator. A DC-DC converter that switches power switching element 8 can be produced using this modulation system.

FIG. 4 shows a step-down chopper DC-DC converter as an example of a method of the prior art that uses ΔΣ modulation. This DC-DC converter is equipped with smoothing circuit 18, ΔΣ modulator 6 is connected to the output side of this smoothing circuit 18 via an error amplification circuit 13, and output side of this ΔΣ modulator 6 is connected to the input of power switching element 8 via a gate driver circuit 7.

A constant voltage output can be obtained by comparing the converter output voltage with a reference voltage, performing ΔΣ modulation by using the error amplification signal voltage of the compared voltage as the modulator input signal of ΔΣ modulator 6, switching power switching element 8 according to the output signal of modulator 6, and inputting the above switching output to smoothing circuit 18.

In contrast to DC-DC converters using a pulse width modulation system (to be referred to as PWM), which has typically been used in the past, being characterized by the switching frequency being constant, DC-DC converters using ΔΣ modulation are synchronized with the sampling frequency given by the ΔΣ modulator, and the output 1 bit signal is changed so that the error between the modulator input signal voltage and modulator output signal voltage becomes minimal. Consequently, the ΔΣ modulator input signal voltage changes according to the DC-DC converter output voltage and as a result, this modulation system has the characteristic of the switching frequency changing.

Although attention has been drawn to the advantage of being able to improve the power conversion efficiency of the converter as compared with the PWM system as a result of holding switching loss, which is power loss due to switching, to a low level since the number of switching cycles is reduced in ΔΣ modulation particularly when the DC-DC converter output current is small, this has the problems described below.

DC-DC converters have the characteristic that, during the time power switching element 8 is off, current flows through rectifier 14 while capacitor 15 discharges, and due to the presence of inductor 16, current decreases gradually instead of sharply, while during the time power switching element 8 is on, current flows to inductor 16 through power switching element 8, capacitor 15 discharges, and due to the presence of inductor 16, current rises gradually, and the current that flows rises the longer the period during which power switching element 8 is on.

In the PWM system, since the switching frequency is constant, although the period during which power switching element 8 is on is nearly constant provided the DC-DC converter output current is constant, in the case of ΔΣ modulation, since the switching frequency is not constant, there are cases in which a state occurs in which power switching element 8 is on for a long period of time even if DC-DC converter output current is constant, and this state occurs easily particularly when the DC-DC converter output current is large.

Due to the above characteristics, since cases can occur in which the period during which power switching element 8 is on becomes long in ΔΣ modulation as compared with PWM modulation, there was the problem of the peak current flowing inside the converter becoming large.

Since power loss of power switching element 8 is determined by the product of the on resistance of power switching element 8 and the square of the current flowing to power switching element 8, if the current flowing to power switching element 8 increases, the power loss in power switching element 8 becomes extremely large. Moreover, since the power loss in rectifier 14 is determined by the forward voltage and current that is flowing, and power loss also becomes large when the current flowing to rectifier 14 increases, particularly in cases in which the DC-DC converter output current is large, converters using ΔΣ modulation had the problem of poor power conversion efficiency as compared with those using PWM modulation due to the large current flowing inside the converter.

That is, in the case of ΔΣ modulation of the method of the prior art, although there is the advantage of high power conversion efficiency as compared with PWM modulation when the DC-DC converter output current is small, when the DC-DC converter output current is large, cases occur in which the peak current flowing inside the converter becomes large, thereby resulting in the problem of a decrease in power conversion efficiency.

SUMMARY OF THE INVENTION

In consideration of the above problems of the prior art, the object of the present invention is to provide a highly efficient DC-DC converter that uses ΔΣ modulation to limit excessive peak current flowing inside the converter by monitoring the current flowing inside the converter with an integrator located inside a ΔΣ modulator.

The present invention for achieving the above object is a DC-DC converter that switches a power switching element by inputting an analog input signal or multi-bit digital signal into a ΔΣ modulator, and conveying that modulated signal to the power switching element via a gate driver circuit, wherein excessive peak current flowing to an inductor is limited by monitoring the current flowing inside the converter with an integrator located inside the ΔΣ modulator.

The ΔΣ modulator is composed of at least one adder, integrator and quantizer, has a feedback pathway that feeds back from the output of the quantizer to the input of at least one adder, at least one integrator is connected to the output of the adder, and at least one output of the integrator is connected to the quantizer.

The DC-DC converter is also provided with an adder serving as the input of the ΔΣ modulator and an integrator connected to the output of that adder, and an analog adder and analog integrator are used in the case of inputting a continuous time signal in the manner of an analog signal to a modulator, while a digital adder and digital integrator are used in the case of inputting a discrete time signal in the manner of a multi-bit digital signal to a modulator.

The quantizer performs sampling on the discrete time signal, while the output of this quantizer and the output of a current control circuit, to which is connected the output of the above integrator and the output of an error amplification circuit, are connected to the input of an AND circuit that determines the final pulse width, and the output signal of this AND circuit is connected to the input of a gate driver circuit that supplies current and voltage sufficient for driving the power switching element.

The output of the above gate driver circuit is connected to the input of a power switching element that switches the input voltage of the DC-DC converter, while the output of the power switching element is connected to a smoothing circuit, and the output of this smoothing circuit becomes the output of the DC-DC converter.

The above feedback pathway in the $\Delta\Sigma$ modulator is equipped with an attenuator that conforms to output signal of the quantizer to the input signal level of the $\Delta\Sigma$ modulator. However, an attenuator having an attenuation factor of 0 is also considered to be included in the case the signal level of the quantizer output and the signal level of the $\Delta\Sigma$ modulator input are already conforming at the outset, and an attenuator is not required.

The present invention has a constitution such that, the output of the above integrator and the output of the above error amplifier are compared by the above current control circuit, an excessive peak signal is generated with the output of the above integrator, and when that excessive peak signal has reached the output signal level of the above error amplifier, a pulse signal is output from the current control circuit, and a signal that switches off the power switching element is applied to the power switching element through a gate driver circuit by the above AND circuit after having received the pulse signal output from the current control circuit.

When large power from a load connected to the DC-DC converter increases and the converter output current increases to a certain extent, although the current flowing to the inductor within the smoothing circuit is always at 0 A or more, and its waveform is a chopping wave that repeatedly increases and decreases according to the on and off state of the power switching element, even though there are cases in which the output voltage of the integrator within the $\Delta\Sigma$ modulator is in the form of a similar chopping wave, and is inverted due to the circuit configuration of the DC-DC converter, since the waveform of the current flowing to the inductor and the waveform of the output voltage of the integrator are analogous, an effect can be obtained that is similar to monitoring the current flowing to the inductor, namely the current flowing within the DC-DC converter, by monitoring the output of the integrator.

Thus, since switching off the power switching element by detecting the peak output voltage of the integrator is equivalent to switching off the power switching element by detecting the peak current flowing within the DC-DC converter, the present invention makes it possible to suppress excessive peak current flowing within the DC-DC converter, and enables the realization of a highly efficient DC-DC converter.

In a DC-DC converter using a $\Delta\Sigma$ modulator, by monitoring the current flowing to an inductor with an integrator composed within the $\Delta\Sigma$ modulator, excessive peak current flowing within the converter can be limited, making it possible to provide a DC-DC converter capable of highly efficient, stable control without requiring a detection resistor.

DETAIL DESCRIPTION OF THE INVENTION

An embodiment of a DC-DC converter according to the present invention is explained with reference to the attached drawings as follows. The same reference symbols are put to the same items in the explanations of the drawings, and duplicate explanations are omitted.

Figure 1:
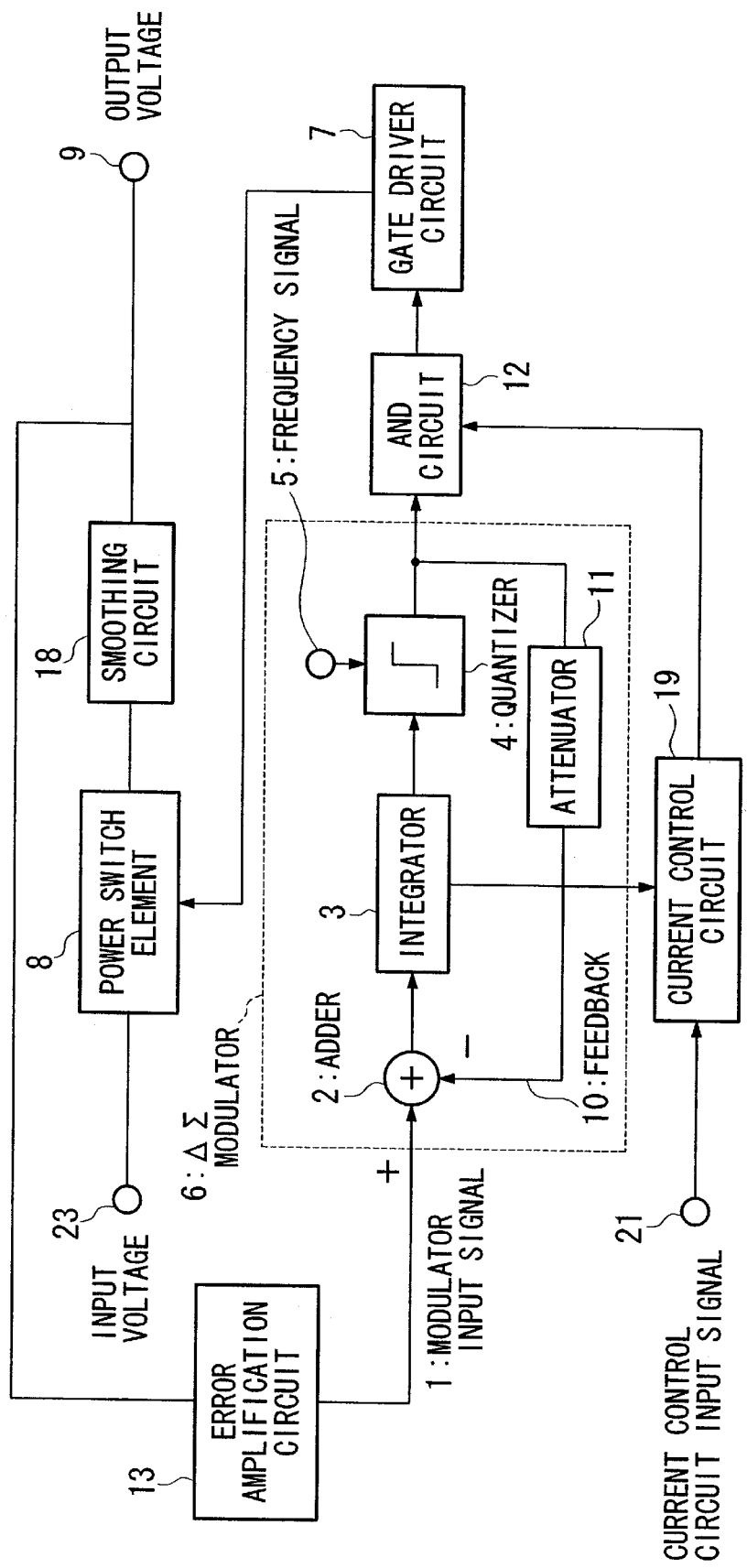
FIG. 1 is a block drawing of one example of an embodiment of the present invention.

FIG. 1 shows a block diagram of an embodiment of the present invention. The present embodiment is composed so as to detect current flowing to an inductor provided in a smoothing circuit 18 by being equipped with $\Delta\Sigma$ modulator 6 and providing an integrator 3 in this $\Delta\Sigma$ modulator 6. In addition, a current control circuit 19 is connected to integrator 3, an AND circuit 12 is connected to this current control circuit 19 and $\Delta\Sigma$ modulator 6, and a power switching element 8 is connected to this AND circuit 12 via a gate driver circuit 7.

In addition, by passing the output signal detected with integrator 3 through current control circuit 19, and supplying a composite pulse signal of the output signal result of this current control circuit 19 and the output signal result of $\Delta\Sigma$ modulator 6 to power switching element 8, excessive peak current that flows to the above inductor and this power switching element 8 is limited.

Moreover, an attenuator 11 is connected to the output of a quantizer 4, and this attenuator 11 is provided with a feedback pathway 10 connected to the input of an adder 2.

The DC-DC converter composed in the above manner operates in the manner described below. Modulator input signal 1 is input to adder 2, the output of this adder 2 is input to quantizer 4 through integrator 3, the output signal of this quantizer 4 is converted to a 1-bit digital signal synchronized with a frequency signal, and this signal is then input to AND circuit 12.

On the other hand, modulator input signal 1 and the output signal of adder 3 are compared in current control circuit 19, and that comparison signal is input to AND circuit 12. The voltage/current of a signal generated according to the signal input to that AND circuit 12 is then amplified in gate driver circuit 7 and supplied to power switching element 8.

Although it is possible to limit current by inserting a detection resistor in series in the converter output current pathway and detecting the current using a voltage signal according to that voltage drop, since a method for limiting current according to the output signal of adder 3 as in the present invention eliminates the need for a detection resistor, there is no loss caused by the resistor, and there is little possibility of noise in the converter circuit stage entering the control loop and causing the control loop to become unstable, thereby enabling stable control.

Figure 2:
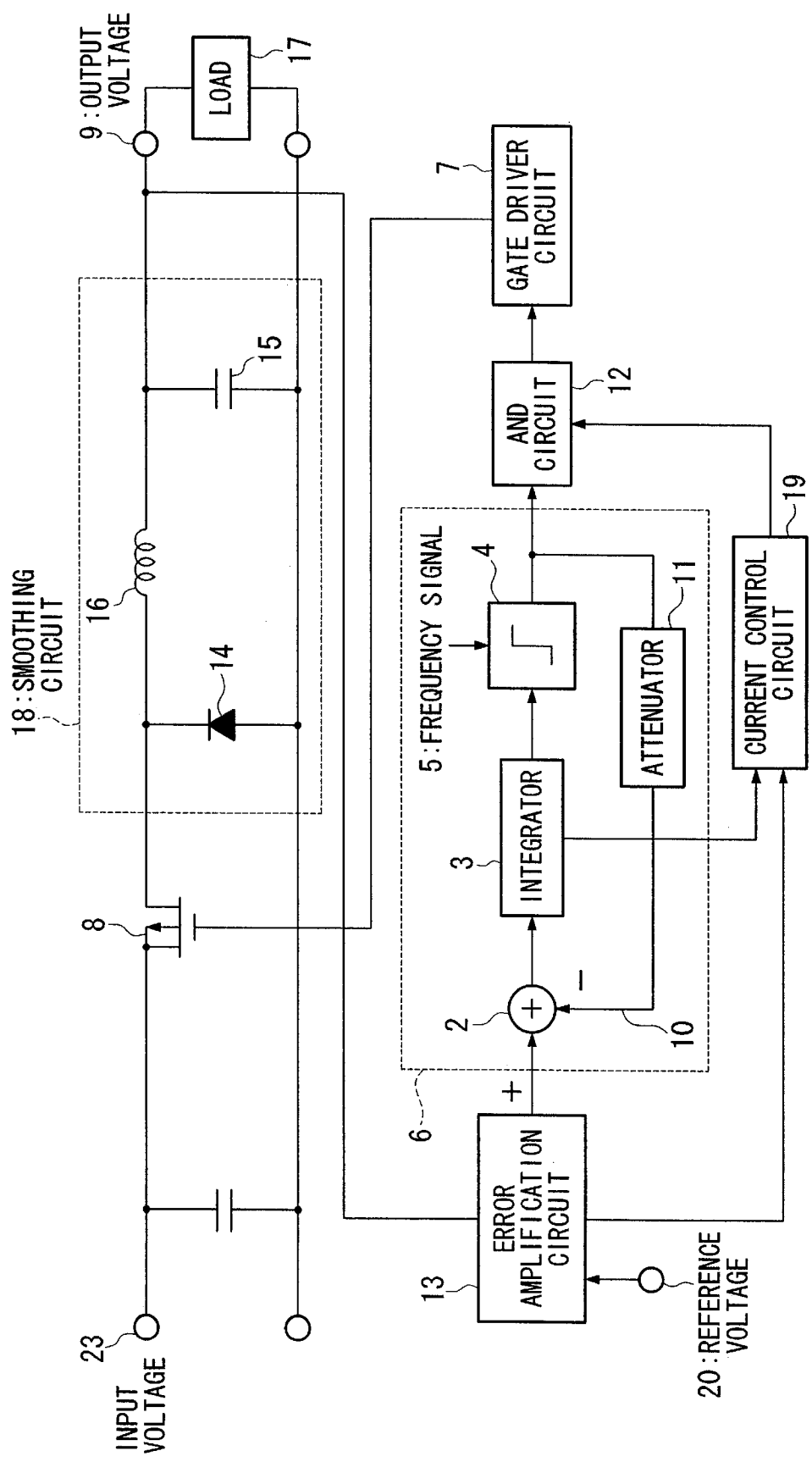
FIG. 2 is a block drawing in which the present invention is applied to a step-down chopper.
Figure 3:
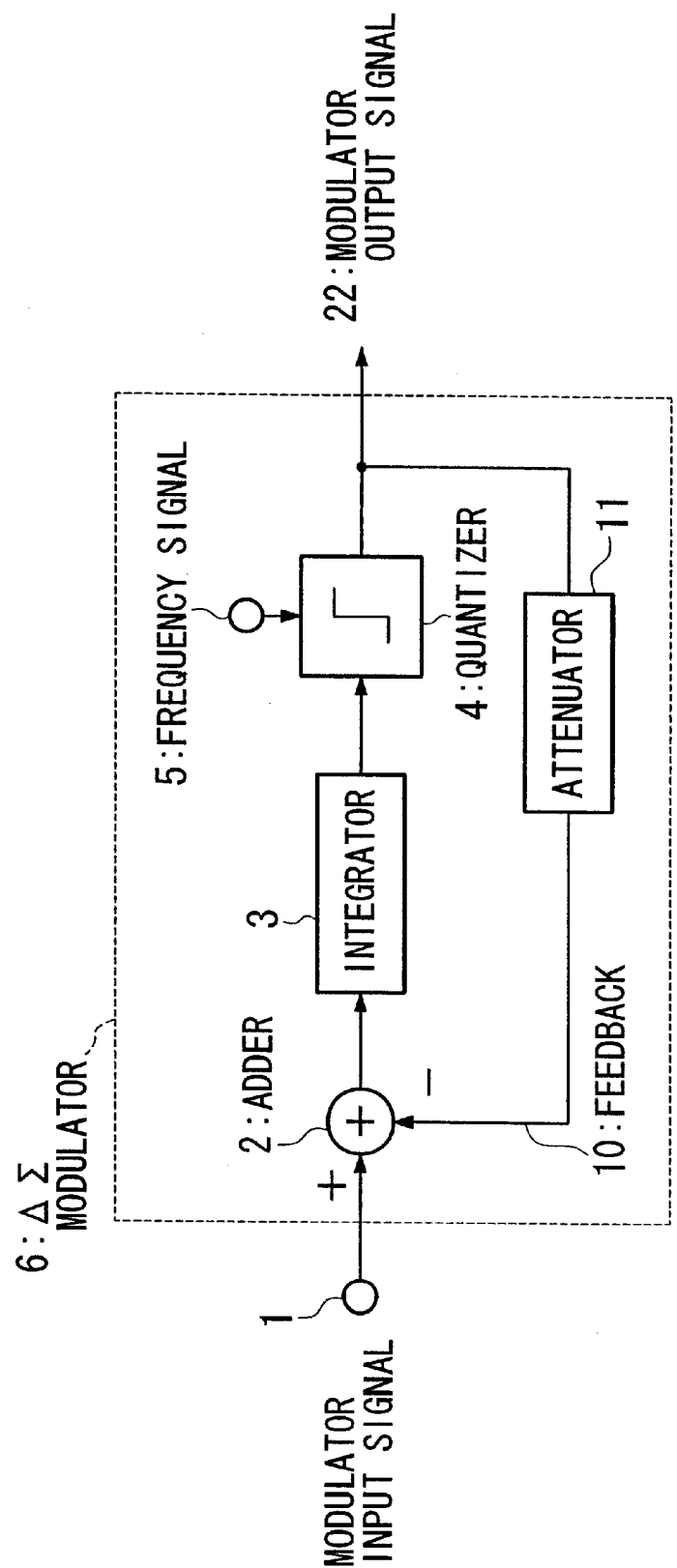
FIG. 3 is a block drawing of a $\Delta\Sigma$ modulator.
Figure 4:
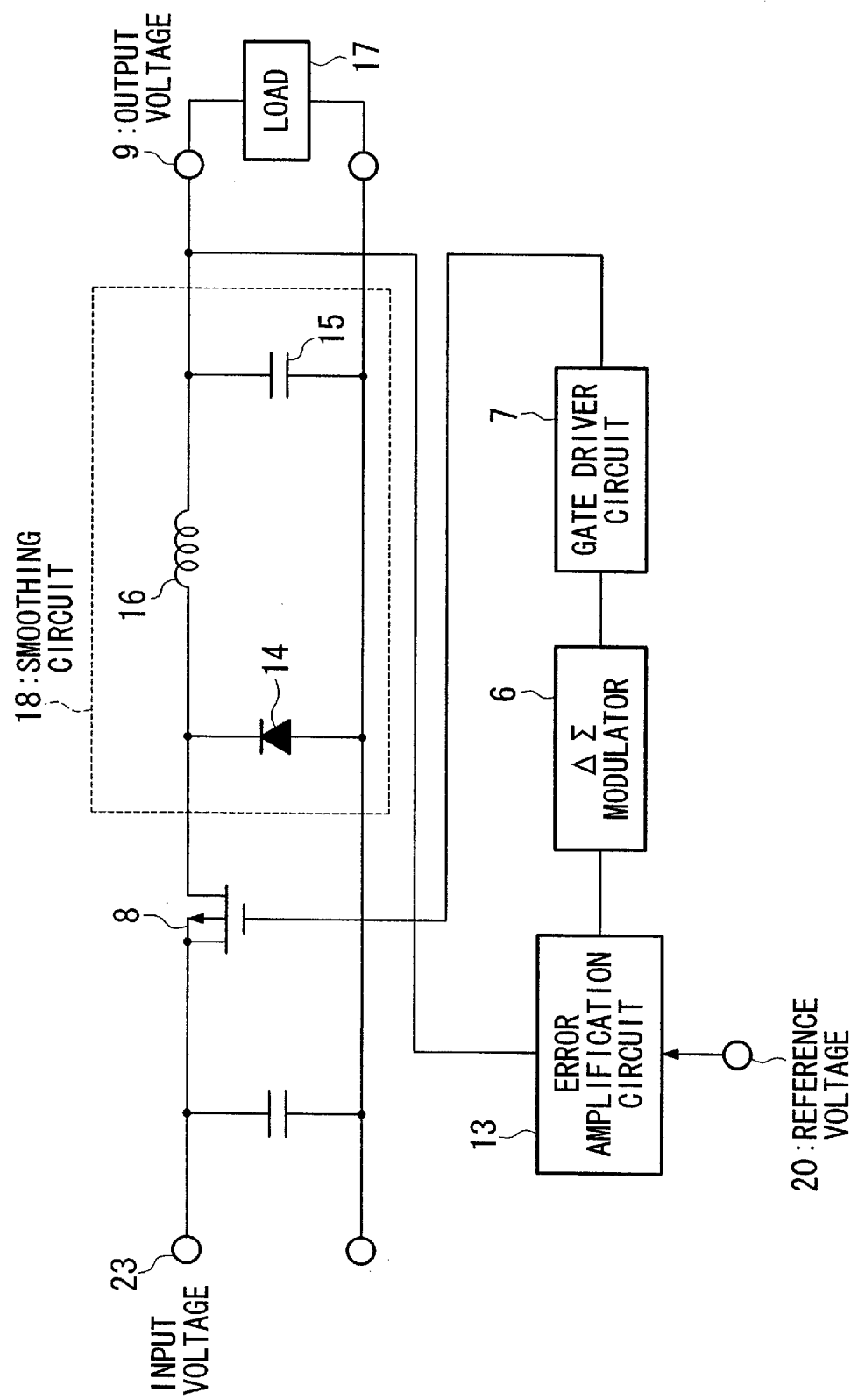
FIG. 4 is a block drawing of a $\Delta\Sigma$ type of step-down chopper of the prior art.

FIG. 2 is a block diagram in which the present invention is applied to a $\Delta\Sigma$ modulation type of step-down chopper. This step-down chopper is composed such that the voltage output to load 17 and the differential voltage of reference voltage 20 are amplified by error amplification circuit 13, a pulse applied to power switching element 8 is generated from the pathway in which that differential voltage is input to $\Delta\Sigma$ modulator 6 and the modulated signal is input to AND circuit 12, and from the pathway in which that differential voltage and the signal obtained from $\Delta\Sigma$ modulator 6 are input to current control circuit 19 and that control signal is input to AND circuit 12, and the pulses generated in that AND circuit 12 are input to gate driver circuit 7 followed by driving power switching element 8 with the output signal of that gate driver circuit 7.

Input voltage 23 is an analog signal, and for example, if a direct current voltage is input, the output of power switching element 8 is able to obtain a direct current voltage for which the power has been amplified. Namely, this input voltage 23 is able to drive a DC-DC converter according to output voltage 9. Since the signal following modulation is converted to a binary signal, the DC-DC converter can be easily composed in the form of an integrated circuit, thereby making it possible to provide a compact DC-DC converter.

In this manner, the pulse signal generated with AND circuit 12 by ΔΣ modulator 6 and the signal of current control circuit 19 are applied to power switching element 8 and limit the current flowing to the above inductor in the form of a pulse signal for which the on width is limited when the peak current of the above inductor has reached the threshold value of error amplification circuit 13.

Although a step-down chopper is described in FIG. 2, the present invention can also clearly be applied to a step-up chopper or polarity inversion chopper by using a similar method.

In addition, a current-limiting ΔΣ modulating DC-DC converter can be realized that limits inductor current by having a pathway in which the output signal of integrator 3 and the output signal of error amplification circuit 13 are input to AND circuit 12 through a comparator, a pathway in which the output signal of error amplification circuit 13 is modulated with adder 2, integrator 3 and quantizer 4 and then input to AND circuit 12, and limiting the on width in AND circuit 12 by the signals of these two pathways.

Moreover, by providing two or more integrators 3 connected in series to the output of this adder 2, or by providing two or more integrators 3 connected in parallel to the output of this adder 2, the former is able to increase sampling accuracy, while the latter is able to accommodate parallel output, thereby making it possible to provide a high-precision, multi-output DC-DC converter in a compact integrated circuit.

What is claimed is:

1. A DC-DC converter comprising:
   a power switching element;
   a smoothing circuit;
   an error amplification circuit provided to an output of the smoothing circuit;
   a ΔΣ modulator connected to an output of the smoothing circuit having the error amplification circuit therebetween so as to perform ΔΣ modulation to an analog signal or multi-bit digital signal;
   an integrator provided in the ΔΣ modulator;
   a gate driver circuit which passes the modulated signal;
   a current control circuit connected to the integrator; wherein,
   output signal of the integrator passes the current control circuit;
   output signal result of the current control circuit and a composite pulse signal of the output signal of the ΔΣ modulator are supplied to the power switching element;
   output voltage of the power switching element passes the smoothing circuit so as to become converter output voltage.

2. The DC-DC converter according to claim 1 wherein, said current control circuit outputs a pulse signal when the output signal of said error amplification circuit that has responded to the output voltage signal of the DC-DC converter is compared with the output signal of said integrator, an excessive peak signal is generated in said integrator, and that excessive peak signal has reached the output signal level of said error amplification circuit.

3. The DC-DC converter according to claim 1 wherein, said ΔΣ modulator and said current control circuit are connected to the input of an AND circuit, the output of this AND circuit is connected to the input of said power switching element via a gate driver circuit, and the logical product of the output signal of said ΔΣ modulator and the output signal of said current control circuit in said AND circuit is supplied to said power switching element via a gate driver circuit.

4. The DC-DC converter according to any one of claim 1 wherein, said ΔΣ modulator is composed of at least one adder, at least one integrator and at least one quantizer, has a feedback pathway that feeds back to the input of at least one said adder from a later stage according to the output of said quantizer, at least one said integrator is connected to the output of said adder, and at least one of the outputs of that integrator is connected to said quantizer.

5. The DC-DC converter according to any one of claim 2 wherein, said ΔΣ modulator is composed of at least one adder, at least one integrator and at least one quantizer, has a feedback pathway that feeds back to the input of at least one said adder from a later stage according to the output of said quantizer, at least one said integrator is connected to the output of said adder, and at least one of the outputs of that integrator is connected to said quantizer.

6. The DC-DC converter according to any one of claim 3 wherein, said ΔΣ modulator is composed of at least one adder, at least one integrator and at least one quantizer, has a feedback pathway that feeds back to the input of at least one said adder from a later stage according to the output of said quantizer, at least one said integrator is connected to the output of said adder, and at least one of the outputs of that integrator is connected to said quantizer.

* * * * *